(12) United States Patent
Neet et al.

(10) Patent No.: US 11,768,479 B2
(45) Date of Patent: Sep. 26, 2023

(54) SYSTEM AND METHOD FOR SECURE CONNECTIONS IN A HIGH AVAILABILITY INDUSTRIAL CONTROLLER

(71) Applicant: Rockwell Automation Technologies, Inc., Mayfield Heights, OH (US)

(72) Inventors: Kyle E. Neet, Northfield, OH (US);
Jack M. Visoky, Willoughby, OH (US);
Krzysztof Glensk, Rybnik (PL);
Jonathan D. Bradford, Cleveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 496 days.

(21) Appl. No.: 17/037,997

(22) Filed: Sep. 30, 2020

(65) Prior Publication Data
US 2022/0100165 A1    Mar. 31, 2022

(51) Int. Cl.
| | | |
|---|---|---|
| *G05B 19/05* | (2006.01) | |
| *G06F 11/00* | (2006.01) | |
| *G05B 19/042* | (2006.01) | |
| *G06F 11/16* | (2006.01) | |
| *G05B 19/406* | (2006.01) | |
| *G06F 21/60* | (2013.01) | |
| *H04L 9/40* | (2022.01) | |

(52) U.S. Cl.
CPC ......... *G05B 19/406* (2013.01); *G06F 21/602* (2013.01); *H04L 63/166* (2013.01); *H04L 63/20* (2013.01); *G05B 2219/31449* (2013.01)

(58) Field of Classification Search
CPC ........ G05B 19/406; G05B 2219/31449; G06F 21/602; G06F 11/2041; G06F 11/2033; G06F 11/2028; H04L 63/166; H04L 63/20; B60W 50/02; B62D 5/003; B62D 5/0484
See application file for complete search history.

(56) References Cited

U.S. PATENT DOCUMENTS

| 5,777,874 A | 7/1998 | Flood et al. |
| 7,197,660 B1 | 3/2007 | Liu et al. |

(Continued)

OTHER PUBLICATIONS

Extended European Search Report dated Feb. 16, 2022; Application No./Patent No. 21195891.3-1202—(11) pages.

*Primary Examiner* — Thuy Dao
(74) *Attorney, Agent, or Firm* — Boyle Fredrickson, S.C.

(57) ABSTRACT

Secure data transmission between an input device and both industrial controllers in a high-availability system utilizes a secure connection established between the primary industrial controller and the input device. Data required to establish the secure connection is stored on the primary controller as part of the connection data corresponding to the secure connection. The input device transmits data to the primary controller over the secure connection according to the desired level of security. The primary controller transmits the connection data defining the secure connection to the secondary controller. If a failure occurs in the primary controller, the secondary controller establishes a connection to the input device using the connection data for the secure connection, such that the secondary controller may assume responsibility for the controller end of the secure connection. The primary controller transmits the input signals to the secondary controller via the dedicated connection between controllers.

20 Claims, 3 Drawing Sheets

(56) References Cited

U.S. PATENT DOCUMENTS

| | | | |
|---|---|---|---|
| 8,693,313 B2 | 4/2014 | Negoto et al. | |
| 8,756,412 B2 | 6/2014 | Pulini et al. | |
| 9,306,801 B2 * | 4/2016 | Yang | H04L 41/0663 |
| 10,742,619 B1 | 8/2020 | Haigh | |
| 10,901,399 B2 * | 1/2021 | Flood | G05B 23/0297 |
| 2005/0172161 A1 | 8/2005 | Cruz et al. | |
| 2018/0343125 A1 | 11/2018 | Clish et al. | |
| 2020/0103861 A1 | 4/2020 | Flood | |

* cited by examiner

SYSTEM AND METHOD FOR SECURE CONNECTIONS IN A HIGH AVAILABILITY INDUSTRIAL CONTROLLER

BACKGROUND INFORMATION

The subject matter disclosed herein relates to secure connections in a high availability industrial controller. More specifically, a system and method for managing a secure connection during a changeover between controllers in a high availability industrial controller is disclosed.

As is known to those skilled in the art, industrial controllers are specialized electronic computer systems used for the control of industrial machinery or processes. An exemplary industrial controller is a programmable logic controller (PLC) used in a factory environment. Industrial controllers differ from conventional computers in a number of ways. Physically, they are constructed to be substantially more robust against shock and damage and to better resist external contaminants and extreme environmental conditions. The processors and operating systems of industrial controllers allow for real-time control and execute languages for ready customization of programs to comport with a variety of different controller applications. Industrial controllers may have a user interface for accessing, controlling, and monitoring the industrial controller.

In a high availability (HA) industrial control system, it is desirable for the controlled machine or process to continue operation to the greatest extent possible. If a fault condition occurs, the industrial controller may take action to maintain operation of a portion of the controlled machine or process or to operate the controlled machine or process in a reduced capacity until the fault condition may be resolved.

If the fault occurs in the industrial controller, it is still desirable to maintain operation to the greatest extent possible. Thus, in many high availability systems, redundant industrial controllers are provided. One of the industrial controllers serves as a primary controller and the other industrial controller serves as a secondary controller. The secondary controller is ready to assume control of the system in the event a failure in the primary controller prevents the primary controller from continuing control.

In order to assume control, the secondary controller must have the same control program, knowledge of the operating states in the primary controller, and knowledge of the operating state of the controlled machine or process. The HA industrial control system typically includes a dedicated, high-speed data link that connects the primary industrial controller with the secondary industrial controller. The high-speed data link may be used to cross load control programs from the primary to the secondary controller when the primary control program changes. Similarly, if a fault condition occurs that requires transfer of control from the primary industrial controller to the secondary industrial controller, the high-speed data link allows rapid cross-loading of data structures, including the operating states from the primary controller. The high-speed data link allows for a rapid and "bumpless" transfer of control from the primary industrial controller to the secondary industrial controller when a malfunction occurs.

In addition to having the same control program and knowledge of the operating states in the primary controller, the secondary controller must also have knowledge of the current state of input devices located on the controlled machine or process. Historically, it has been known to provide redundant wiring from the input devices to each controller. As the complexity of controlled machines and processes increased, however, the number of input devices and the amount of wiring required similarly increased. In order to reduce the amount of wiring between input devices and the controllers, the input signals were provided to input modules and the input modules were configured to communicate via a network. Optionally, the input modules could be placed in a remote rack with an adapter module. The adapter module can be configured to communicate with multiple input modules via a backplane and aggregate input data into a single, or multiple, data packets for communication via the network. The input signals can be communicated via an industrial network from the adapter module to the industrial controllers. Optionally, some input devices may similarly be configured to communicate directly with the industrial controllers via the industrial network.

To maintain high-availability, the industrial network may include redundant network cables running between each industrial controller and the input devices. One or more network switching devices, such as a router, a switch, a gateway, or the like, may be included in the industrial network and redundant devices may be included to achieve a desired level of availability. In order to transmit the input signals across the network to multiple industrial controllers, the data packets containing input signals are transmitted as multi-cast data packets. The primary controller and the secondary controller may be configured to utilize a designated multi-cast address such that each controller is able to receive the input signals from the industrial network.

Multi-cast data packets are not, however, without certain drawbacks. Multi-cast addresses are a set of reserved addresses and are publicly known according to a network protocol being used. In addition, standard security protocols, such as authentication and encryption of data between the input device and the industrial controller, are not supported by multi-cast data packets. As a result, the data transmitted over the industrial network is susceptible to snooping or spoofing. A third-party device connected to the network and configured to receive multi-cast data packets at the same address utilized by the controllers would receive the same data being transmitted to the industrial controllers. In order to establish a secure connection between the input device and an industrial controller, the input device must use a unicast message. The input device, therefore, is only able to transmit input signals to one of the industrial controllers.

Thus, it would be desirable to provide a system for providing secure data transmission between an input device and both industrial controllers in a high-availability system.

BRIEF DESCRIPTION

According to one embodiment of the invention, a method for secure connections in a high availability industrial controller is disclosed. A first secure connection is established over an industrial network between a primary controller and at least one input device, where connection data defines the first secure connection. The connection data information is transmitted from the primary controller to a secondary controller via a communication connection between the primary and secondary controllers. Multiple input signals are received from the at least one input device at the primary controller via the first secure connection when the primary controller is executing without a fault condition. The input signals are transmitted from the primary controller to the secondary controller, and the primary controller is monitored to detect the fault condition in the primary controller. When the fault condition is detected, the first secure connection is transferred from the primary controller to the secondary controller, and the input signals are received from the at least one input device by the secondary controller via the first secure connection.

According to another embodiment of the invention, a system for secure connections in a high availability industrial controller for a controlled machine or process includes at least one input device, a first industrial automation controller, and a second industrial automation controller. The at least one input device is configured to receive input signals from devices on the controlled machine or process. The first industrial automation controller is configured to establish a first secure connection between the first industrial automation controller and the at least one input device over an industrial network, wherein connection data defines the first secure connection. The second industrial automation controller is in communication with the first industrial automation controller, and the second industrial automation controller is configured to receive the connection data from the first industrial automation controller after the first industrial automation controller establishes the first secure connection. The first industrial automation controller is further configured to receive the plurality of input signals from the at least one input device via the first secure connection and to transmit the plurality of input signals to the second industrial controller. The first controller is monitored for a fault condition and the first secure connection is transferred from the first controller to the second controller when the fault condition is detected.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
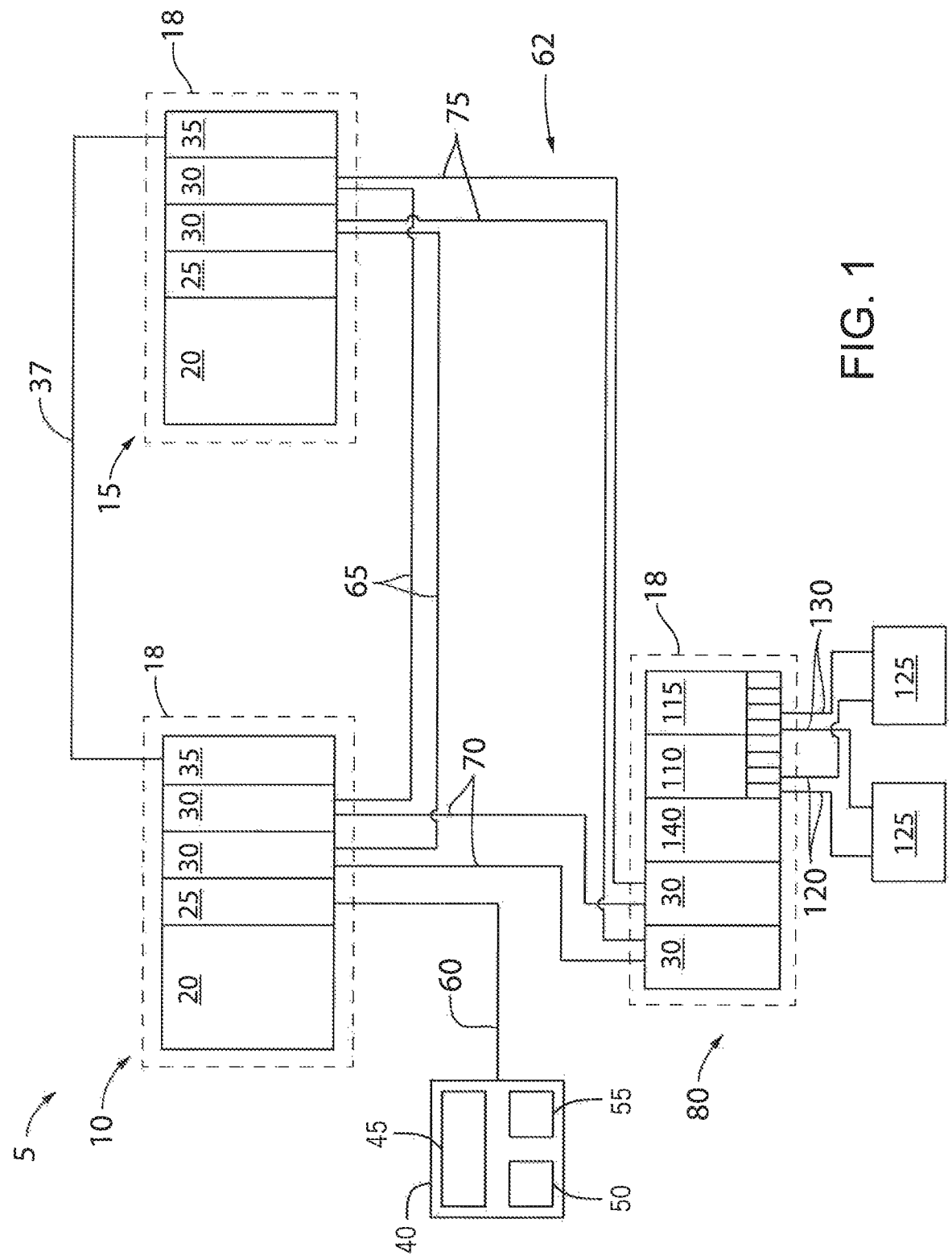
FIG. 1 is a block diagram representing a high availability industrial automation system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system and method for providing secure data transmission between an input device and both industrial controllers in a high-availability system. A secure connection is established between the primary industrial controller and an input device in a controlled machine or process. The secure connection may require authentication of a device, verification of data integrity, encryption of data, or a combination thereof. The secure connection may be established using known security protocols such as those established under the Common Industrial Protocol (CIP) for EtherNet/IP® devices. Authentication ensures that both devices in a connection are trusted devices and may be accomplished using certificates or pre-shared keys. Verification of data integrity utilizes an authentication code transmitted along with the data. The authentication code may be generated, for example, by executing a hash algorithm on the data packet to generate an authentication code, such as a checksum. The hash algorithm to be utilized is known by both devices and a receiving device may verify that the data was unchanged during transmission by performing the same function on the received data packet and by comparing the authentication code generated by the receiving device to the authentication code transmitted along with the data. Encryption of data utilizes any suitable encryption algorithm, where the encryption algorithm is similarly known by both devices. An encryption key may be generated by the transmitting device and sent to the receiving device for use in decrypting received data. Any data required to establish the secure connection is stored on the primary controller as part of the connection data corresponding to the secure connection. Utilizing this secure connection, the input device may transmit data to the primary controller according to the desired level of security.

The primary controller, in turn, manages transmission of the input signals received via the secure connection to the secondary controller. As an initial step, the primary controller transmits the connection data defining the secure connection to the secondary controller. The secondary controller establishes a connection to the input device using the connection data for the secure connection with the primary controller, such that the secondary controller is ready to assume responsibility for the controller end of the secure connection in the event a failure occurs in the primary controller. If the primary controller experiences a fault, the secondary controller assumes the address of the primary controller, as received in the connection data, and assumes control of the secure connection previously established by the primary controller. When the primary controller is executing without a fault condition, the input device transmits input signals to the primary controller. The primary controller may transmit the input signals to the secondary controller via a dedicated connection or via the industrial network connecting the controllers. According to one aspect of the invention, the primary controller may first perform the secure data functions, such as authentication, data integrity validation, or decryption, as required by the secure connection and, subsequently transmit the input signals to the secondary controller. According to another aspect of the invention, the primary controller may transmit the data packets received from the input device directly to the secondary controller and the secondary controller may perform the secure data function on the received data according to the connection data previously received from the primary controller.

Turning initially to FIG. 1, an industrial automation system 5 includes a first (or primary) industrial automation controller 10 and a second (or secondary) industrial automation controller 15 configured to control operation of a controlled machine or process. As illustrated, the first and second industrial automation controllers 10 and 15 are modular and may be made up of numerous different modules connected together on a rack or rail (represented by dashed line 18). Additional modules may be added or existing modules removed and the first and second industrial automation controllers 10 and 15 reconfigured to accommodate the new configuration. In the exemplary industrial automation system 5 shown, both the first and second industrial automation controllers 10 and 15 include a power supply module 20, a processor module 25, and a pair of network modules 30. Each industrial automation controller 10 and 15 is further shown with an additional module 35 that may be selected according to the controller requirements. In a high-availability system, the additional module 35 may be a redundancy module. The redundancy modules 35 are configured to establish a dedicated, high-speed communication link 37 between the controllers and to establish which controller operates as the primary controller and which controller operates as the secondary controller.

An operator interface 40 is shown connected to the industrial automation system 5. The operator interface 40 can include a processing portion 45, an input device 50, and an output device 55. The input device 50 can include, but is not limited to, a keyboard, touchpad, mouse, trackball, or touch screen. The output device 55 can include, but is not limited to, a display, speaker, or printer. It is contemplated that each component of the operator interface 40 may be incorporated into a single unit, such as an industrial computer, laptop, or tablet computer. It is further contemplated that multiple operator interfaces can be distributed about the industrial automation system 5. The operator interface 40 may be used to display operating parameters and/or conditions of the controlled machine or process, receive commands from the operator, or change and/or load a control program or configuration parameters. An interface cable 60 connects the operator interface 40 to the first industrial automation controller 10.

The first and second industrial automation controllers 10 and 15 are connected to other devices by a network 62 according to the application requirements. An interface cable 65 connects the network modules 30 of the controllers 10 and 15. A first interface cable 70 connects the first industrial controller to a remote rack 80, and a second interface cable 75 connects the second industrial controller to the remote rack 80. According to the illustrated embodiment, the network modules 30 and interface cables 65, 70, 75 are each arranged in a redundant configuration. It is contemplated that the network cables 65-75 may be custom cables configured to communicate via a proprietary interface or may be a standard industrial cable for a non-proprietary network. Exemplary non-proprietary networks include EtherNet/IP®, DeviceNet®, or ControlNet®. The network cables 65-75 connect the controllers 10, 15 and racks 80 of the network 62 in what is referred to as a ring arrangement. It is contemplated that other network arrangements are possible for coupling the elements of the network 62, including arrangements that have switches that allow for redundancy communication paths, daisy-chain arrangements, star (simple or multi-layered) arrangements, or more complicated topologies such as redundant local area networks (LANs). The network modules 30 are configured to communicate according to the protocol of the network to which it is connected and may be further configured to translate messages between two different network protocols. Although illustrated as a wired network, where all connections are established via network cables 65-75, it is further contemplated that a portion of the network 62 may also include wireless communication.

The remote rack 80 is modular and may include numerous different modules connected together in a rack or mounted to a rail. Additional modules may be added or existing modules removed (e.g., one of the redundant network modules 30) and the remote rack 80 reconfigured to accommodate the new configuration. As illustrated, the remote rack 80 includes a pair of network modules 30, an input module 110, and an output module 115. The pair of network modules 30 allows for network redundancy at the remote rack 80. Each of the input modules 110 is configured to receive input signals 120 from devices 125 on the controlled machine or process. Each of the output modules 115 is configured to provide output signals 130 to devices 125 on the controlled machine or process. An input module and an output module may be combined into a singular module, and collectively the input and output modules may be referred to as I/O modules. Optionally, still other modules 140 may be included in the remote rack 80. It is understood that the industrial automation system 5, the industrial automation controllers 10 and 15, and remote rack 80 may take numerous other forms and configurations without deviating from the scope of the invention.

Figure 2:
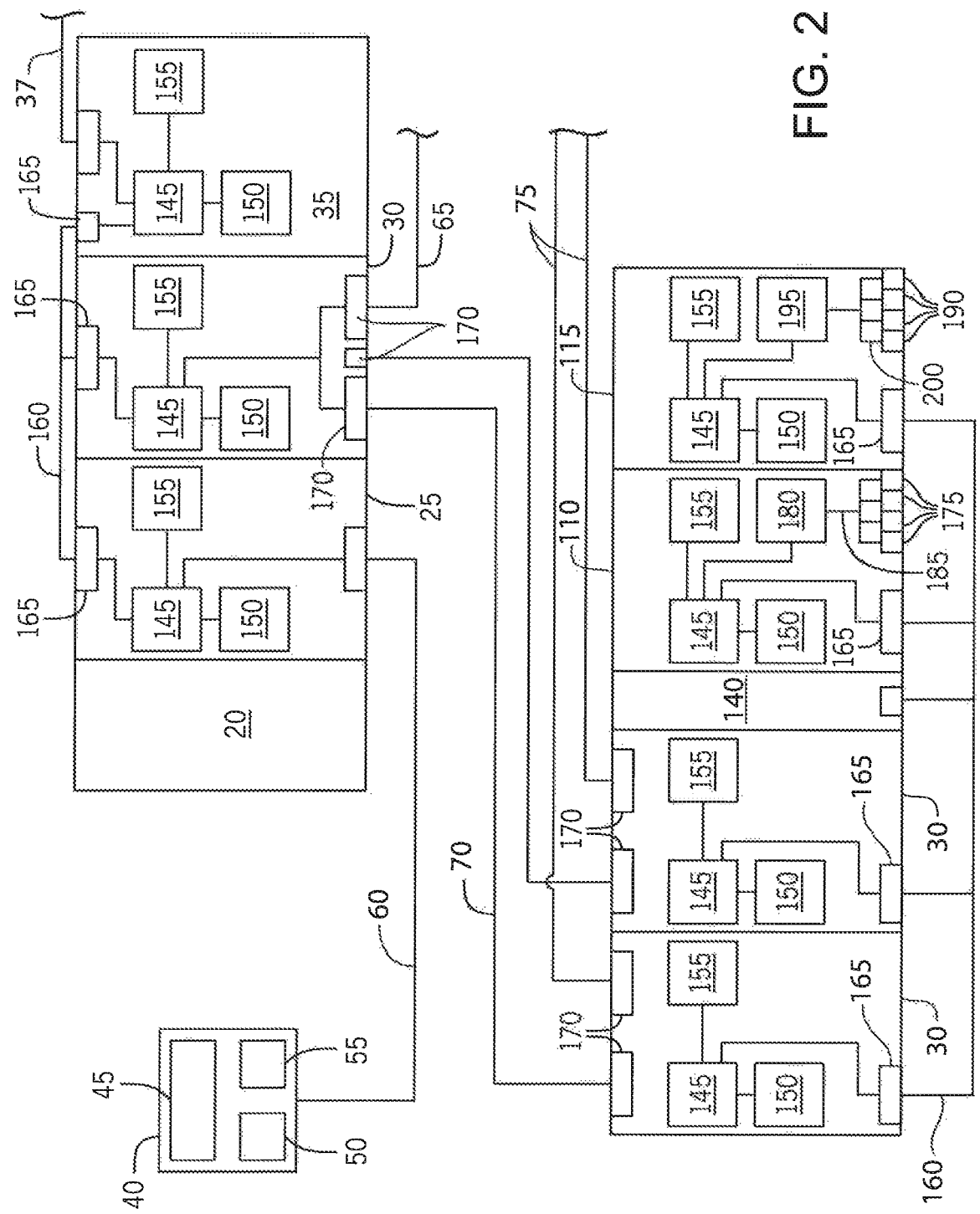
FIG. 2 is a block diagram representing some aspects of the exemplary industrial automation system of FIG. 1 in greater detail.

Referring next to FIG. 2, a portion of the exemplary industrial automation system of FIG. 1 is illustrated in block diagram form. It is contemplated that each of the nodes in the network may include a processor 145 and a memory 150. The processors 145 are configured to execute instructions and to access or store operating data and/or configuration parameters stored in the corresponding memory 150. The processors 145 are suitable processors according to the node requirements. It is contemplated that the processors 145 may include a single processing device or multiple processing devices executing in parallel and may be implemented in separate electronic devices or incorporated on a single electronic device, such as a field programmable gate array (FPGA) or application specific integrated circuit (ASIC). The memory devices 150 are non-transitory storage mediums that may be a single device, multiple devices, or may be incorporated in part or in whole within the FPGA or ASIC. Each of the nodes also includes a clock circuit 155, and each clock circuit 155 is preferably synchronized with the other clock circuits 155 according to, for example, the IEEE-1588 clock synchronization standard. Each clock circuit 155 generates a time signal configurable to report the present time accurate to either microseconds or nanoseconds. Communication between nodes mounted in the same rack or contained within a single housing occurs via a backplane 160 and a corresponding backplane connector 165. Nodes communicating via network media 65-75 include ports 170 configured to process the corresponding network protocol. The input module 110 includes input terminals 175 configured to receive the input signals 120 (FIG. 1) from the controlled devices 125. The input module 110 also includes any associated logic circuitry 180 and internal connections 185 required to process and transfer the input signals 120 from the input terminals 175 to the processor 145. Similarly, each output module 115 includes output terminals 190 configured to transmit the output signals 130 (FIG. 1) to the controlled devices 125 (FIG. 1). The output module 115 also includes any associated logic circuitry 195 and internal connections 200 required to process and transfer the output signals 130 from the processor 145 to the output terminals 190.

In operation, the primary and secondary industrial controllers 10, 15 work in tandem to provide a high availability system 5. For purposes of discussion, the other module 140 in the embodiment illustrated in FIG. 1 will be discussed as if it is configured as an I/O adapter. Optionally, the function of the I/O adapter may be incorporated into the network module 30, and the network module 30 may serve as a gateway between the industrial network 62 and data passed on a backplane in the remote rack 80. Although a single input module 110 is illustrated, there may be multiple input modules 110 connected via a backplane to the I/O adapter 140. Each of the input modules 110 receives input signals 120 from the devices 125 on the controlled machine or process and transmits the signals to the I/O adapter. The I/O adapter assembles each of the input signals 120 into data packets for transmission via the industrial network 62. The I/O adapter is further configured to receive data packets from the industrial network 62. The received data packets include output signals 130 for the devices on the controlled machine or process. The I/O adapter extracts the output signals 130 from each data packet and transmits the output signal to the corresponding output module 115 which, in turn, sends the output signal 130 to the corresponding device 125 on the controlled machine or process.

Figure 3:
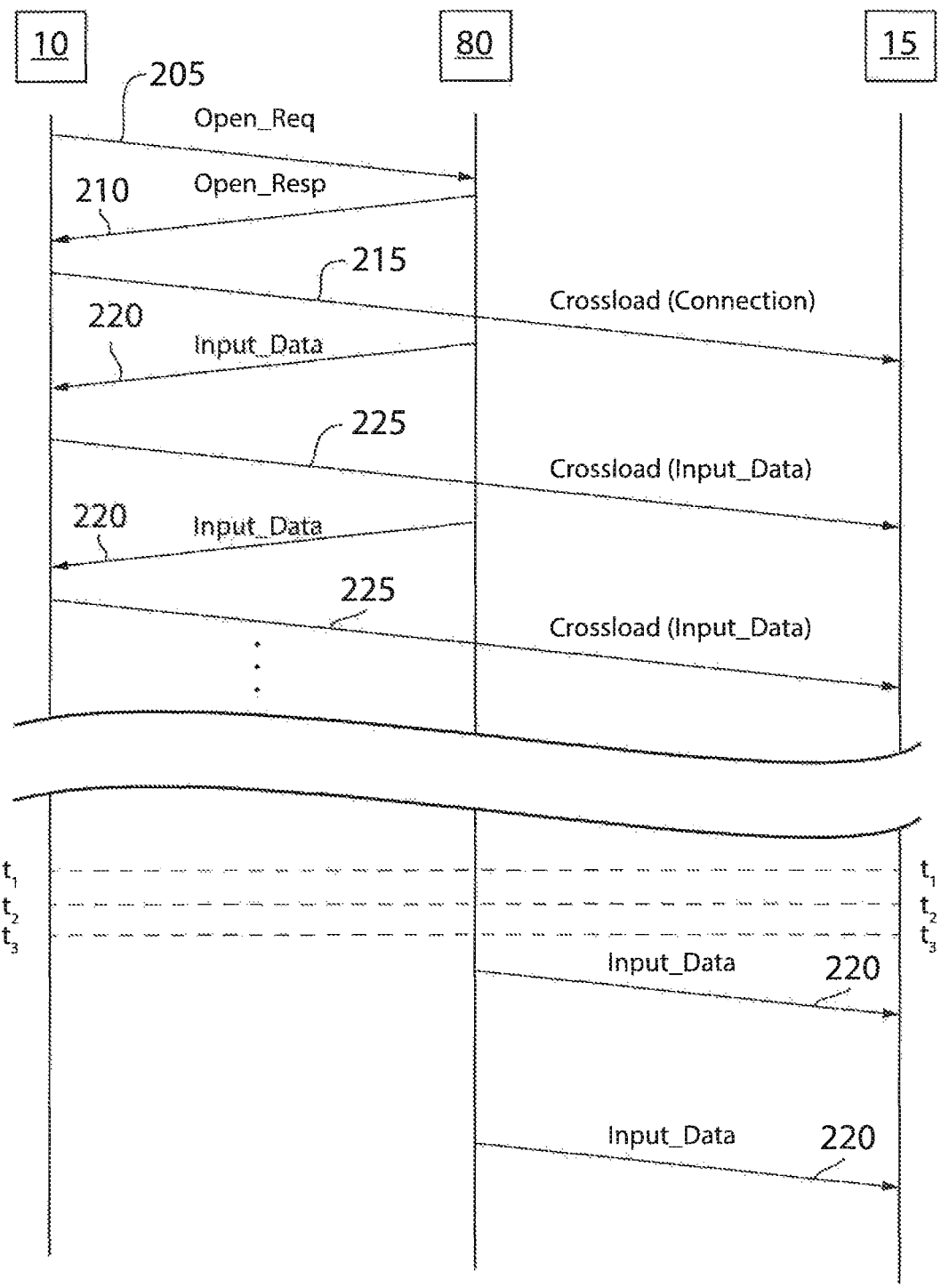
FIG. 3 is a timing diagram illustrating opening of a secure connection, secure transmission of input signals to redundant controllers, and switchover from a primary controller to a secondary controller.

Turning next to FIG. 3, operation of the first and second industrial controllers 10, 15 during normal operation is illustrated in the upper portion of the timing diagram. The first industrial controller 10 is configured to establish a connection with one of the input devices. The illustrated embodiment identifies the remote rack 80 as the device to which the first industrial controller 10 is establishing a connection. Identification of the remote rack 80 is intended to be illustrative and not limiting. The first industrial controller 10 communicates via one of the network modules 30 in the controller to one of the network modules 30 on the remote rack. The processor module 25 in the industrial controller generates a data packet for transmission and the I/O adapter 140, one of the input modules 110, or one of the output modules 115 receives the data packet. Thus, it could be said that any one of the modules on the industrial controller 10, 15 establishes a connection to any one of the modules on the remote rack 80. The connection is established via a connection open request 205 sent from the first industrial controller 10 to the remote rack 80. The remote rack 80 sends a connection open response 210 to the first industrial controller acknowledging receipt of the open request 205 and establishing the connection.

Industrial networks are increasingly being connected to external networks to permit, for example, remote monitoring and diagnostic capabilities of the controlled machine or process. However, such connections provide opportunity for undesirable activity, such as spoofed or intercepted data packets, whether intentional or unintentional. In order to ensure the controlled machine or process continues operation in a safe and desired manner, it may be desirable to include some level of network security for the connections between the first industrial controller 10 and the remote rack 80.

As discussed above, the connection may require authentication of the industrial controller 10 to the remote rack 80 and authentication of the remote rack 80 to the industrial controller. Authentication may include transmission of a certificate or key which may, for example, be loaded into the device during manufacture or commissioning of the system. The connection may optionally require a higher level of security and perform a verification check on the integrity of the data or may even encrypt data before transmission. The methods used for verification of data integrity and encryption may be selected by the first industrial controller 10 and a flag set, indicating the selected method, or a hash or encryption key may be included in the connection open request 205 and transmitted to the remote rack 80. The remote rack 80 acknowledges receipt of the desired level of security in the response 210 message and transmits data to the first controller 10 using the desired level of security.

Having established the connection with the remote rack 80, the first industrial controller 10 transmits the connection data to the second industrial controller 15 via a crossload data packet 215. The crossload data packet 215 may be transmitted using the high-speed data link 37 between the two controllers. Included in the crossload data packet is any information required by the second industrial controller 15 to assume one-half of the connection in the event the first industrial controller 10 faults. This includes, for example, an address of the remote rack 80, a connection identifier, an address of the first industrial controller 10, and any data related to the desired level of security for the connection. If the crossload data packet 215 is transmitted using the high-speed data link 37, this link is a dedicated connection only available to the two controllers 10, 15 and does not require additional security. Optionally, the crossload data packet 215 may be transmitted via the network cable 65 extending between the two controllers 10, 15. It may be desirable to first establish a secure connection between the two controllers 10, 15 in a manner similar to that discussed above for establishing a secure connection between the first industrial controller 10 and the remote device 80 before transmitting the crossload packet 215. It is contemplated that the secure connection between controllers 10, 15 may use the same security protocol as the secure connection between the first industrial controller 10 and the remote network 80. Optionally, the secure connection between controllers 10, 15 may use still other security protocols.

Once the secure connection has been established between the first industrial controller 10 and the remote rack 80, the remote rack 80 begins transmitting input data messages 220 back to the first industrial controller 10. The input data messages 220 may be messages referred to as implicit messages. An implicit message is transmitted at a predefined periodic interval rather than on a request/response basis. The input data is continually changing as a function of the operating states of the controlled machine or process and must be transmitted back to the first industrial controller 10. Further, sampling of the input data at a predefined and repeated interval is required for improved control. Thus, an implicit message allows for the input data to be sampled and transmitted at the desired periodic interval rather than requiring the first industrial controller 10 to request data and wait for a response message.

Unlike prior high availability systems in which input data messages were multicast to both industrial controllers 10, 15 a secure connection requires that the data message 220 is transmitted only between the source (i.e., the remote rack 80) and the destination (i.e., the first industrial controller 10). However, should the second industrial controller 15 need to assume responsibility for operation of the controlled machine or process, the second industrial controller 15 will need to have knowledge of the present status of the input signals 120 and must also receive future data messages 220, providing knowledge of the input signals 120 as their status changes. As will be discussed in more detail below, the second industrial controller 15 will assume control of one end of the secure connection established between the first industrial controller 10 and the remote rack 80 in order to receive future data messages. In order to assume control of the secure connection, the second industrial controller 15 will also need to know the present state of the secure connection.

In order to keep the second industrial controller 15 informed of the present status of input signals 120, the first industrial controller 10 transmits a crossload packet 225 containing the input signals 120 after it receives each data message 220 from the remote rack. The crossload packet 225 may be transmitted via the high-speed data link 37. According to one aspect of the invention, the first industrial controller 10 may first perform the required security functions on the received data message 220, such as authentication, verification, and/or decryption. The first industrial controller 10 may then transmit clear values of the input signals 120 to the second industrial controller 15 via the crossload packet 225. Optionally, the first industrial controller 10 may be configured to simply retransmit the received data message 220 as the crossload packet 225 to the second industrial controller 15. Because the connection data was previously transmitted to the second industrial controller 15, the second industrial controller may verify authenticity or integrity of the input data or decrypt the input data, if necessary.

Turning next to the lower half of the timing diagram in FIG. 3, operation of the first and second industrial controllers 10, 15 is illustrated when a fault occurs in the first industrial controller 10 occurs. At time, $t_1$, a fault occurs in the first industrial controller 10. At time, $t_2$, the second industrial controller 15 detects the fault condition. It is contemplated that the first industrial controller 10 may periodically transmit a heartbeat message to the second industrial controller 15. Loss of the heartbeat message may trigger detection of the fault condition. Optionally, the redundancy module 35 in the first industrial controller 10 may monitor health of the processor module 25. If the redundancy module 35 detects a fault in the processor module 25 that prevents continued operation of the processor module 25, the redundancy module may transmit a changeover message to the redundancy module 35 in the second industrial controller 15. According to yet another option, the second industrial controller 15 may periodically transmit a status check to the first industrial controller 10. If the second industrial controller 15 receives no response from the status check, the second controller 15 determines that a fault has occurred in the first industrial controller 10. Regardless of the method of fault detection, it is desirable that the second industrial controller 15 detects the presence of a fault condition on the first industrial controller 10 quickly such that the input data message 220 is not lost. However, depending on the timing of the occurrence and the detection of the fault, it is possible that one or more input data message 220 may be lost. Nevertheless, it would be desirable to switch over control to the second industrial controller 15 with minimal input data messages 220 being lost.

At time, $t_3$, in FIG. 3, the second industrial controller 15 assumes responsibility for the secure connection within the remote rack 80 utilizing the connection data received from the first industrial controller 10 in the crossload data packet 215. The new connection is established using the same connection identifier and address from the first industrial controller 10 such that transferring the connection from the first industrial controller 10 to the second industrial controller 15 is transparent to the remote rack 80. The remote rack 80 continuously transmits the input data via the industrial network 62. The receiving device, however, switches from the first industrial controller 10 to the second industrial controller 15 such that the second industrial controller 15 begins receiving the input data messages 220. As shown after time, $t_3$, the input data messages 220 are now received directly at the second industrial controller. Further, the second industrial controller 15 had previously received information regarding any security associated with the input data messages. The second industrial controller may authenticate, verify, or decrypt data as required according to the security level associated with the input data messages 220.

According to one aspect of the invention, it is contemplated that the secure connection between the first industrial controller 10 and the remote rack 80 may be established using a Datagram Transport Layer Security (DTLS) protocol. As is understood, the DTLS protocol maintains a sequence number to help prevent packet replay in secure packets. The sequence number is continually incremented as each input data message 220 is sent from the remote rack 80 to the first industrial controller 10. The first industrial controller 10 maintains a record of the sequence number for the last valid received message and only accepts input data messages 220 that have receive sequence numbers within an acceptable range of the stored sequence number. In order for the second industrial controller 15 to assume control of the connection if the first industrial controller 10 faults, the second industrial controller 15 must have knowledge of the sequence number for incoming data packets. The first industrial controller 15 may include the sequence number in the crossload packet 225 containing the input signals 120. As a result, the second industrial controller 15 is continually updated on the current sequence number for input data signals as it receives the status of the input signals.

In addition to receiving input signals 120 via the secure connection, the first industrial controller 10 transmits data to the remote rack 80 via the secure connection. The first industrial controller 10 may need to transmit output signals 130 for the output modules 115 to deliver to the controlled devices 125. The first industrial controller 10 may also need to transmit configuration messages to one of the remote modules. Similar to the sequence number for received data packets, such as the input data messages 220, the first industrial controller 10 maintains a sequence number for transmitted data packets. In order for the second industrial controller 15 to take over transmission of the output messages, it must also know the sequence number for the transmitted data packets. The first industrial controller 10 will periodically send a crossload data packet to the second industrial controller 15 that includes the transmitted packet sequence number. The transmitted packet sequence number is sent at a sufficient frequency such that the value of the transmitted packet sequence number in the second industrial controller 15 is within an acceptable range of the present sequence number for the data packets being transmitted from first industrial controller 10 to the remote rack 80. When the second industrial controller 15 takes over the connection from the first industrial controller 10, it must be able to generate new data packets for the remote rack 80 within the acceptable range of the sequence number for the last valid data packet received at the remote rack 80 so that the remote rack is able to accept the new data packets from the second industrial controller.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for secure connections in a high availability industrial controller, the method comprising the steps of:
    establishing a first secure connection over an industrial network between a primary controller and at least one input device, wherein connection data defines the first secure connection;
    transmitting the connection data from the primary controller to a secondary controller via a communication connection between the primary and secondary controllers;
    receiving a plurality of input signals from the at least one input device at the primary controller via the first secure connection when the primary controller is executing without a fault condition;
    transmitting the plurality of input signals from the primary controller to the secondary controller;
    detecting the fault condition in the primary controller; and
    transferring the first secure connection from the primary controller to the secondary controller when the fault condition is detected and receiving the plurality of input signals from the at least one input device at the secondary controller via the first secure connection when the primary controller has the fault condition.

2. The method of claim 1 wherein the communication connection between the primary and secondary controller is a second secure connection.

3. The method of claim 2 wherein the second secure connection utilizes an identical security protocol as the first secure connection.

4. The method of claim 1 wherein the first secure connection is established via a Datagram Transport Layer Security (DTLS) protocol.

5. The method of claim 4 wherein the primary controller maintains a sequence number corresponding to a sequence number of a prior message transmitted to at least one remote device via the first secure connection, the method further comprising the step of:
    transmitting the sequence number from the primary controller to the secondary controller at a periodic interval.

6. The method of claim 1 wherein the first secure connection includes encryption of data transmitted between the at least one input device and the primary controller and wherein the connection data includes information to decrypt the data.

7. The method of claim 6 wherein:
    the connection data includes an encryption key;
    the encrypted data is transmitted between the primary controller and the secondary controller via the communication connection; and
    the secondary controller decrypts the encrypted data using the encryption key.

8. The method of claim 1, wherein the communication connection between the primary controller and the secondary controller is established via the industrial network.

9. The method of claim 8 wherein the primary controller establishes a second secure connection between the primary controller and the secondary controller to transmit the connection data and the plurality of input signals from the primary controller to the secondary controller via the second secure connection.

10. A system for secure connections in a high availability industrial controller for a controlled machine or process, the system comprising:
    at least one input device configured to receive a plurality of input signals from devices on the controlled machine or process;
    a first industrial automation controller configured to establish a first secure connection between the first industrial automation controller and the at least one input device over an industrial network, wherein connection data defines the first secure connection; and
    a second industrial automation controller in communication with the first industrial automation controller, wherein the second industrial automation controller is configured to receive the connection data from the first industrial automation controller after the first industrial automation controller establishes the first secure connection, and wherein:
    the first industrial automation controller is further configured to:
    receive the plurality of input signals from the at least one input device via the first secure connection, and
    transmit the plurality of input signals to the second industrial controller; and
    the second industrial automation controller is further configured to transfer the first secure connection from the first controller to the second controller when a fault condition is detected in the first controller.

11. The system of claim 10 further comprising at least one redundancy module, wherein the redundancy module is configured to detect the fault condition in the first controller and wherein the redundancy module is configured to determine which of the first controller and the second controller is controlling the controlled machine or process.

12. The system of claim 10 further comprising a dedicated communication connection between the first industrial controller and the second industrial controller.

13. The system of claim 12 wherein the dedicated communication connection is a second secure connection.

14. The system of claim 13 wherein the second secure connection utilizes an identical security protocol as the first secure connection.

15. The system of claim 12, wherein the dedicated communication connection between the first industrial controller and the second industrial controller is established via the industrial network.

16. The system of claim 15 wherein the first industrial controller establishes a second secure connection between the first industrial controller and the second industrial controller to transmit the connection data and the plurality of input signals from the first industrial controller to the second industrial controller via the second secure connection.

17. The system of claim 10 wherein the first secure connection is established via a Datagram Transport Layer Security (DTLS) protocol.

18. The system of claim 17 wherein the first industrial controller maintains a sequence number corresponding to a sequence number of a prior message transmitted to at least one remote device via the first secure connection, the method further comprising the step of:
  transmitting the sequence number from the first industrial controller to the second industrial controller at a periodic interval.

19. The system of claim 10 wherein the first secure connection includes encryption of data transmitted between the at least one input device and the first industrial controller and wherein the connection data includes information to decrypt the data.

20. The system of claim 19 wherein:
  the connection data includes an encryption key;
  the encrypted data is transmitted between the first industrial controller and the second industrial controller; and
  the second industrial controller decrypts the encrypted data using the encryption key.

* * * * *